(12) United States Patent
Hoover et al.

(10) Patent No.: US 10,605,253 B2
(45) Date of Patent: Mar. 31, 2020

(54) COMPRESSOR WITH OFFSET DIFFUSER FOR INTEGRAL BLEED

(71) Applicant: HONEYWELL INTERNATIONAL INC., Morris Plains, NJ (US)

(72) Inventors: Robert Hoover, Phoenix, AZ (US);
Greg Ockenfels, Phoenix, AZ (US);
Paul Zonneveld, Phoenix, AZ (US);
Keith Sangston, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 297 days.

(21) Appl. No.: 15/823,701

(22) Filed: Nov. 28, 2017

(65) Prior Publication Data
US 2019/0162197 A1    May 30, 2019

(51) Int. Cl.
*F04D 27/00* (2006.01)
*F04D 29/68* (2006.01)
(Continued)

(52) U.S. Cl.
CPC .......... *F04D 27/009* (2013.01); *B64D 41/00* (2013.01); *F02C 3/04* (2013.01); *F02C 3/08* (2013.01); *F02C 6/08* (2013.01); *F02C 9/18* (2013.01); *F04D 17/10* (2013.01); *F04D 27/0207* (2013.01); *F04D 29/22* (2013.01); *F04D 29/4206* (2013.01); *F04D 29/4233* (2013.01); *F04D 29/441* (2013.01); *F04D 29/682* (2013.01); *F05D 2220/50* (2013.01)

(58) Field of Classification Search
CPC ...... F02C 9/18; F02C 6/08; F02C 3/08; F04D 29/22; F04D 29/4206; F04D 29/4233; F04D 29/441; F04D 29/68; F04D 29/682; F04D 27/0207; F04D 17/10; F04D 27/009

See application file for complete search history.

(56) References Cited

U.S. PATENT DOCUMENTS 5,235,801 A    8/1993  Evenson et al.
5,235,803 A *  8/1993  Rodgers ................ F01D 17/162
                                                     415/155

(Continued)

FOREIGN PATENT DOCUMENTS

FR    2025284 A5 *  9/1970  ................ F02C 6/08
FR    2025284 A5    9/1970

OTHER PUBLICATIONS

European Patent Office, Extended European Search Report for Application No. 18208968.0, dated Apr. 17, 2019.

*Primary Examiner* — Craig Kim
(74) *Attorney, Agent, or Firm* — Lorenz & Kopf, LLP

(57) ABSTRACT

A compressor system is provided with an impeller disposed to rotate in a compressor chamber. A diffuser extends around the impeller to collect fluid leaving the impeller. Main flow is discharged from the diffuser through an exit providing an opening that extends circumferentially around the compressor. A bleed annulus extends around the compressor and has a consistent cross-sectional area. A bleed port that opens the diffuser to the bleed annulus and that is configured to divert a bleed flow of the fluid from the main flow before discharge through the exit. The bleed port has a circumference around the compressor and a flow size that varies around the circumference. Variation in the flow size of the bleed port maintains a uniform flow distribution around the exit.

20 Claims, 8 Drawing Sheets

(51) Int. Cl.
*F04D 17/10* (2006.01)
*F04D 29/44* (2006.01)
*F04D 29/22* (2006.01)
*F02C 6/08* (2006.01)
*F02C 3/04* (2006.01)
*B64D 41/00* (2006.01)
*F04D 29/42* (2006.01)
*F04D 27/02* (2006.01)
*F02C 9/18* (2006.01)
*F02C 3/08* (2006.01)

(56) References Cited

U.S. PATENT DOCUMENTS

| | | |
|---|---|---|
| 7,094,024 B2 | 8/2006 | Nguyen et al. |
| 9,726,032 B2 | 8/2017 | Ress, Jr. et al. |
| 2008/0019829 A1* | 1/2008 | Argaud .................. F01D 5/046 |
| | | 415/211.2 |
| 2009/0000307 A1* | 1/2009 | Tatebayashi ............ F01D 9/045 |
| | | 60/785 |
| 2013/0051974 A1* | 2/2013 | Poon .................. F04D 29/4206 |
| | | 415/1 |
| 2016/0186601 A1* | 6/2016 | Manning ............... F01D 25/002 |
| | | 415/121.2 |
| 2017/0211586 A1* | 7/2017 | Gage .................... F04D 29/284 |
| 2017/0248155 A1* | 8/2017 | Parker ................. F04D 29/682 |

* cited by examiner

COMPRESSOR WITH OFFSET DIFFUSER FOR INTEGRAL BLEED

TECHNICAL FIELD

The present invention generally relates to compressor systems, and more particularly relates to uniformly distributed bleed from a compressor of an integral bleed auxiliary power unit.

BACKGROUND

An auxiliary power unit ("APU") generates power for supply to various systems, such as those of an aircraft, for purposes such as environmental cooling, lighting, powering electronic systems, and main engine starting. Typically, APUs are located in the aft section of the aircraft such as the tail cone. An APU may be powered by a gas turbine, which includes a compressor stage for supplying pressurized combustion air. The compressor stage supplies combustion air to the combustion chamber and may also include a bleed system to divert high pressure air for use in various aircraft systems. This provides an integral bleed system. Accordingly, flow is split between one supply to the combustion chamber and another to the bleed air system. Splitting the flow without negatively impacting combustion in the gas turbine is a challenge.

Accordingly, it is desirable to provide systems that provide effective and economical bleed air supply without creating a mal-distribution of air supplied to the combustion chamber. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a compressor system is provided with an impeller disposed to rotate in a compressor chamber. A diffuser extends around the impeller to collect fluid leaving the impeller. Main flow is discharged from the diffuser through an exit that provides an opening that extends circumferentially around the compressor. A bleed annulus extends around the compressor and has a consistent cross-sectional area. A bleed port opens the diffuser to the bleed annulus to divert a bleed flow of the fluid from the main flow before its discharge through the exit. The bleed port has a circumference around the compressor and a flow size that varies around the circumference. Variation in the flow size of the bleed port maintains a uniform flow distribution around the exit.

In other embodiments, a compressor system includes a compressor with a housing defining a compressor chamber. An impeller has an outer periphery and is disposed to rotate in the compressor chamber to move a fluid away from the outer periphery. A diffuser extends around the impeller and collects the fluid leaving the outer periphery of the impeller. A main flow of the fluid is discharged from the diffuser through an exit that provides an opening that extends circumferentially around the compressor. A bleed annulus extends around the compressor in an annular shape and has a consistent cross-sectional area for circumferential flow of the fluid around the compressor. A bleed port opens the diffuser to the bleed annulus to divert a bleed flow of the fluid from the main flow before discharge of the main flow through the exit. The bleed port has a circumference around the compressor and a flow size that varies around the circumference. Variation in the flow size of the bleed port maintains a uniform flow distribution around the exit.

In additional embodiments, a compressor system has a compressor for supplying combustion air to the combustor of an auxiliary power unit of an aircraft. A housing defines a compressor chamber in which an impeller is disposed to rotate. The impeller has a discharge area defined by its outer periphery. A diffuser extends around the outer periphery to collect gas leaving the discharge area of the impeller. The gas is discharged through an annular exit from the diffuser to the combustor. A bleed annulus extends around the compressor and has a consistent cross-sectional area around the compressor. A bleed port opens the diffuser to the bleed annulus to divert gas from the diffuser before discharge through the annular exit. The bleed port has a circumference around the compressor and a flow size that varies around the circumference. A bleed scoop receives the gas from the bleed annulus that is diverted from the diffuser through the bleed port. Variation in the flow size of the bleed port maintains a consistent, uniform flow distribution around the annular exit to the combustor.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
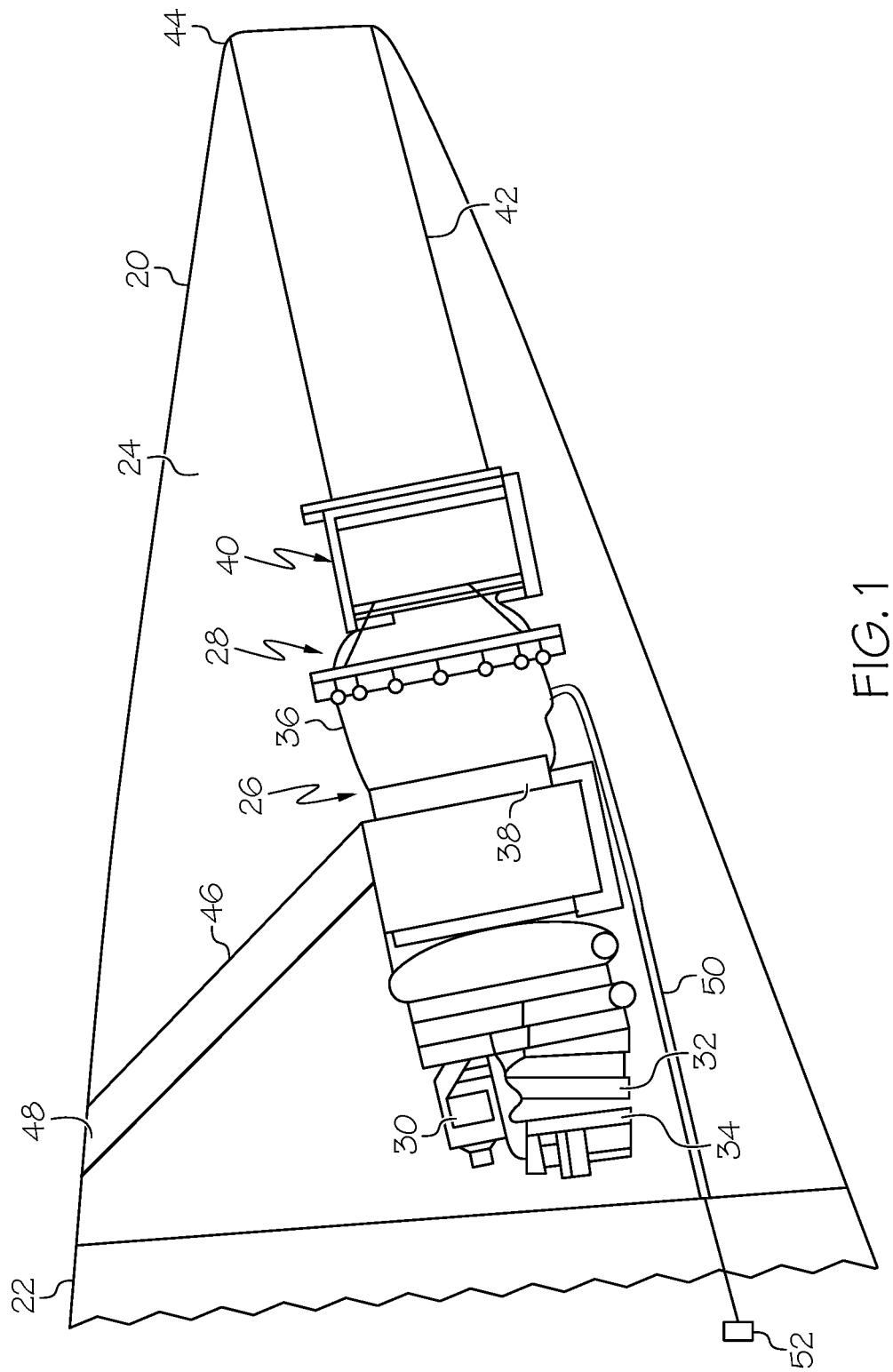
FIG. 1 is a cross-sectional illustration of a tail cone area of an aircraft including an APU with a bleed system, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, an improved manner of separating bleed and main flows leaving a compressor is accomplished by influencing the flow characteristics through the design of the bleed port. When not corrected by the design of the bleed port, non-uniform main flow may result from non-uniform bleed flow, or may result from other conditions related to the construction of the compressor or downstream influences on the main flow. In examples, flow leaving the compressor impeller enters a diffuser and the bleed flow is separated prior to exit of the main flow from the compressor system. Variation in the bleed port around the circumference of the diffuser corrects an otherwise circumferential mal-distribution of the main flow providing a uniform flow around the circumference. In general, compressor system performance is influenced by varying the bleed port around the circumference of the compressor. It has been discovered that doing so eliminates any need for a volute to collect the bleed flow leaving the diffuser. The volute of a compressor is a defined chamber that collects the gas leaving the impeller and serves as a circumferential passage with increasing area. A volute has a curved scroll-like chamber/passage that increases in area as it circles the compressor and approaches the discharge point.

In the examples given herein, the compressor and the bleed and main flow streams may be associated with an APU system, but the disclosure is not limited in application to such systems. In an APU the main flow is used to deliver a fluid in the form of combustion air to the combustor of a gas turbine. Accordingly, uniform flow around the circumference of the combustor is desirable. The current disclosure is applicable to other applications where tailored circumferential flow characteristics, whether uniform or non-uniform, are desirable.

In an example of the present disclosure as further described below, a compressor includes a diffuser extending around the outer periphery of an impeller to collect gas leaving the discharge area of the impeller. An annular exit directs the main flow for discharge from the diffuser. A bleed annulus extends around the compressor and has a consistent cross-sectional area around the compressor. A bleed port opens the diffuser to the bleed annulus to divert gas from the diffuser before discharge through the annular exit. The bleed port has a circumference around the compressor and a flow size that varies around the circumference. From the bleed annulus, the gas that is diverted from the diffuser through the bleed port, exits the compressor. Variation in the flow size of the bleed port maintains a consistent flow distribution of the main flow around the annular exit. Including a bleed annulus of constant circumferential area avoids the need for a more costly and space consuming volute or scroll-type passage.

As noted above, the compressor system described herein may be employed in a variety of applications. By way of an exemplary embodiment involving a gas turbine APU as illustrated in FIG. 1, the tail cone 20 area of an aircraft 22 defines a compartment 24 that houses the APU 26. The APU 26 generally includes a turbine 28 which powers the APU 26, a starter 30 for starting the APU 26, a gearbox 32 for driving various loads including a generator 34 for supplying electrical power, a power compressor 38 for supplying air to the turbine 28, a combustor 36, an eductor system 40 for pumping air, and an exhaust duct 42 for delivering exhaust out of the tail 44 of aircraft 22. The compressor 38 receives outside air from an inlet duct 46 that extends between the APU 26 and an inlet opening 48. In addition to supplying a main flow of combustion air to the turbine 28, the compressor 38 delivers, via a bleed system, compressed air for pneumatic powered systems 52 of the aircraft 22 through a supply duct 50. Accordingly, gas in the form of air is compressed by the compressor 38 and delivered for separate uses including by the combustor 36 and by the systems 52. The air supplied to the systems 52 is referred to as bleed air, which is separated from the main flow going to the combustor 36 internally in the compressor 38.

Figure 2:
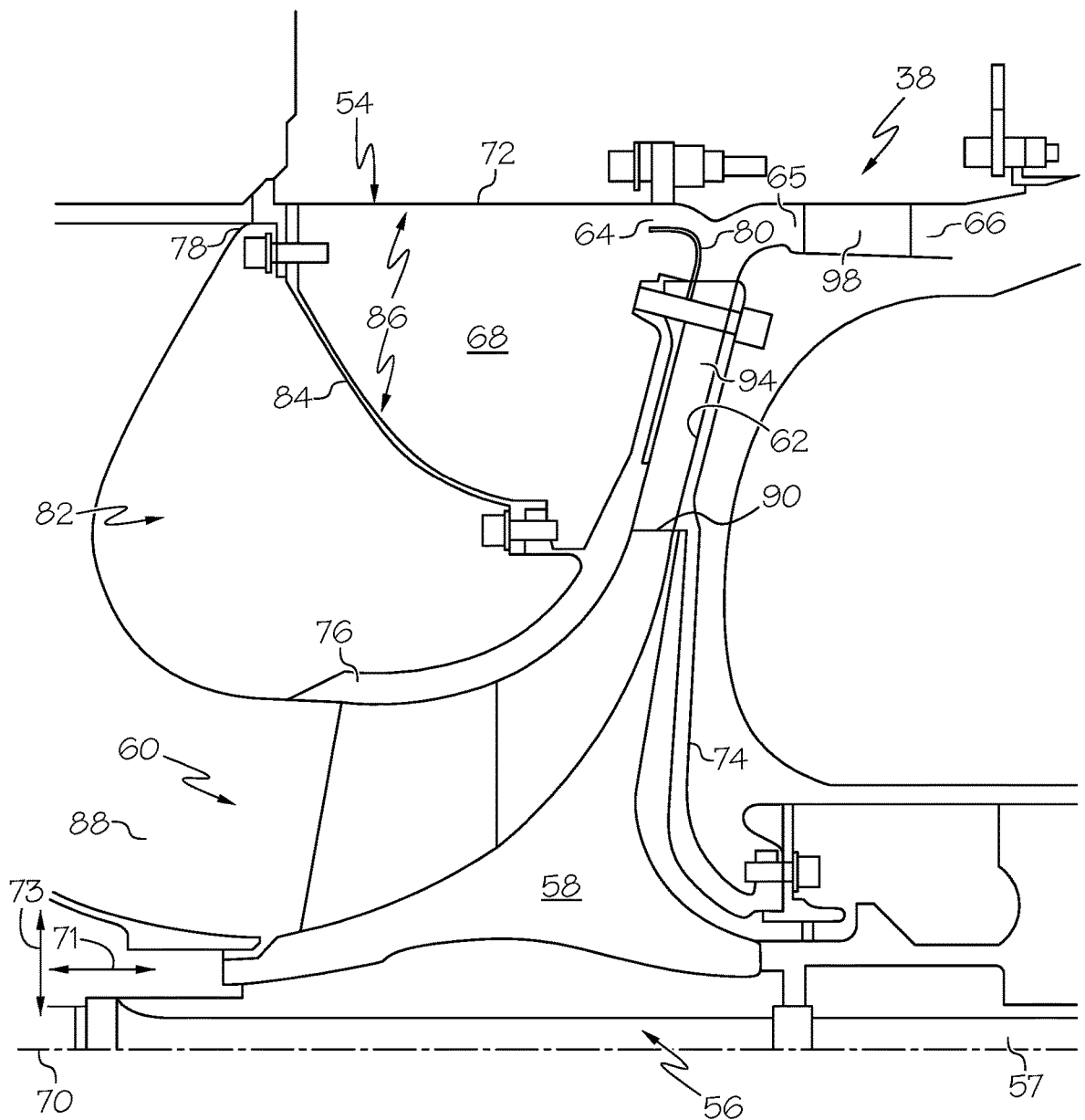
FIG. 2 is a cross-sectional illustration of an exemplary compressor system with bleed, as may be incorporated into the APU in FIG. 1.

With reference to FIG. 2, the compressor 38 generally includes a housing 54 that defines a number of chambers and passages, and a rotor 56 with a shaft 57 and an impeller 58. More specifically, the housing 54 defines an impeller chamber 60, a diffuser 62, a bleed port 64, a main exit passage 65 leading to a main exit 66, and a bleed annulus 68. Shown is a part of the compressor 38 between the rotational axis 70 and the outer peripheral wall 72. It will be appreciated that the compressor 38 extends completely around the axis 70, and in this illustration the lower part (as viewed), is omitted for simplicity. In this example, an axial direction 71 is a direction that extends along the axis 70 or parallel thereto. A radial direction 73 is a direction extending toward or away from the axis 70 and general normal thereto.

In addition to the outer peripheral wall 72, the housing 54 includes a back wall 74 located behind the impeller 58 and extending generally from the shaft 57 to the area of the main exit 66. The various walls of the housing 54, or sections thereof, may be formed from a single layer of material, or from plural layers. As such, the back wall 74 helps define a part of the impeller chamber 60 and a rear side of the diffuser 62. The compressor's inlet is upstream (left as viewed in FIG. 2), of the impeller 58. The housing 54 also includes a forward wall 76 that starts at a forward end 78 and loops around along the contour of the impeller 58 and the diffuser 62, to a rearward end 80 at or near the bleed port 64. The forward wall 76 helps define a part of the impeller chamber 60 and a forward side of the diffuser 62. Along with the outer peripheral wall 72, the forward wall 76 defines an annular space 82. An intermediate wall 84 extends across the annular space 82 separating out the bleed annulus 68. The bleed annulus 68 encircles the axis 70 and has a cross sectional area 86 that is consistent in size completely around the axis 70. In other examples, the cross-sectional area 86 may vary at points around the axis 70, but the bleed annulus 68 is not formed as a volute and does not have an increasing area/scroll-like shape.

During operation of the compressor 38, the rotor 56 rotates and the impeller 58 draws air through the inlet 88 and expels air at its outer periphery 90 into the diffuser 62. The diffuser 62 is generally a disk-shaped annular space extending around the impeller 58 and may include vanes 94 as further described below. The diffuser 62 leads from the outer periphery 90 in a radial direction 73, outward toward the peripheral wall 72 to the main exit 66. The main exit 66 is annular in shape providing an opening completely around the axis 70 that directs air to the combustor 36 (shown in FIG. 1). Uniform flow around the circumference of the main exit 66 is required to avoid unwanted combustion traits such as hot spots. Accordingly, the components defining the diffuser 62 and the main exit passage 65 may provide a consistent flow path at all points around the axis 70. In addition, the main exit passage 65 may include de-swirl features 98, such as baffles or vanes.

Figure 3:
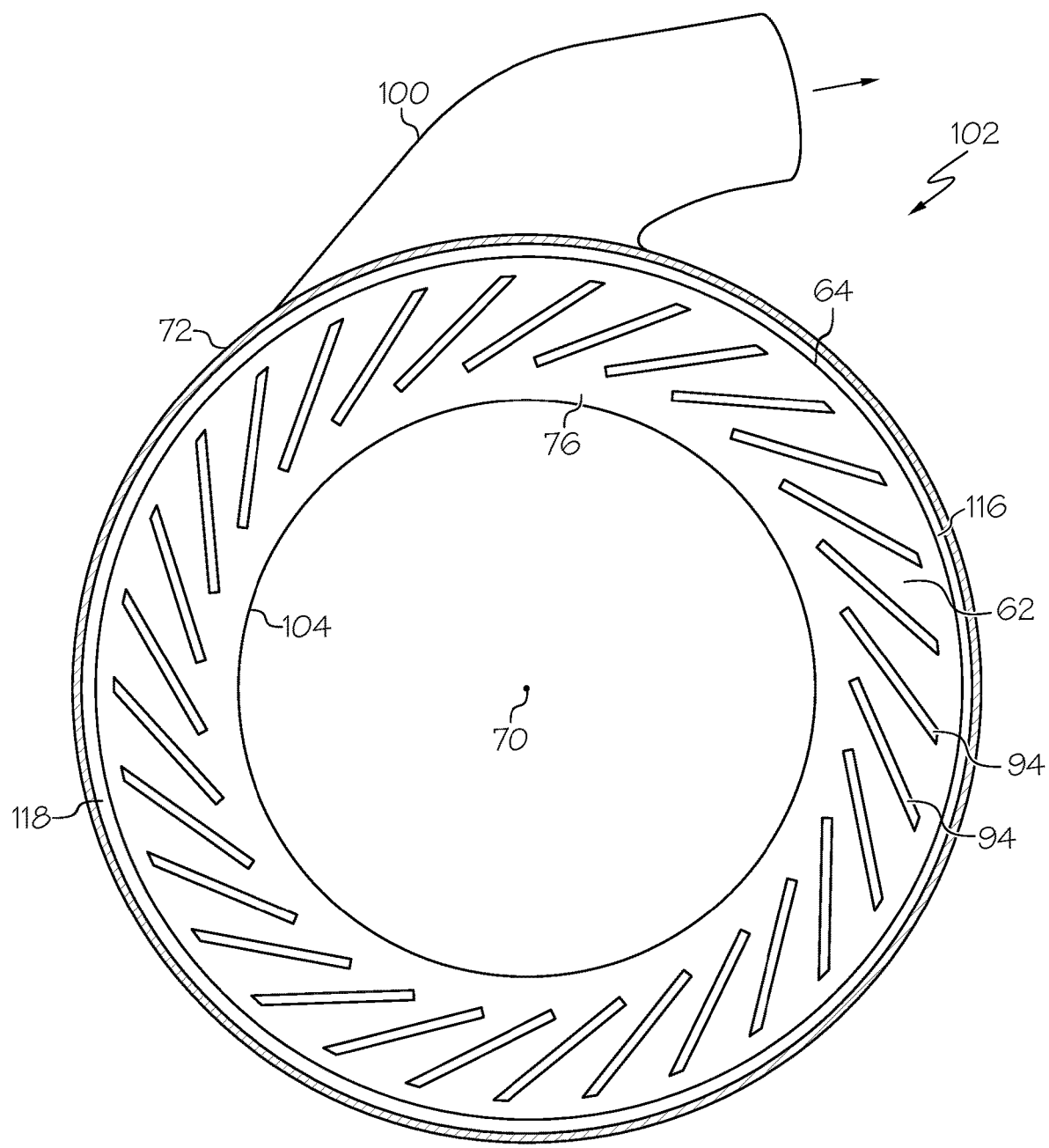
FIG. 3 is a schematic illustration of the bleed port of the compressor system with annular collector of FIG. 2.

In the embodiment of FIG. 2, the bleed port 64 diverts flow from the diffuser 62 prior to its entry into the main exit passage 65. From the bleed port 64, bleed flow enters the bleed annulus 68 from which it is discharged at one location around the circumference of the compressor 38 through a bleed scoop 100 as shown in FIG. 3. Illustrated in FIG. 3 is a housing section 102 which is the part of the housing 54 (shown in FIG. 2), that includes at least part of the forward wall 76, is located forward of the diffuser 62 and defines a part of the diffuser 62. For purposes of illustration, the housing section 102 is shown in isolation removed from the compressor 38, and includes a circular opening 104 in which the impeller 58 is disposed when the compressor 38 is assembled. The housing section 102 includes at least part of the forward wall 76 and of the outer peripheral wall 72. In this embodiment, the area of the diffuser 62 includes a number of vanes 94 disposed in a consistent pattern around the axis 70 which help direct flow through the diffuser 62. Located in the radial direction 73 outward from the vanes 94, the housing section 102 defines the bleed port 64, which can be seen as an annular opening.

Figure 4:
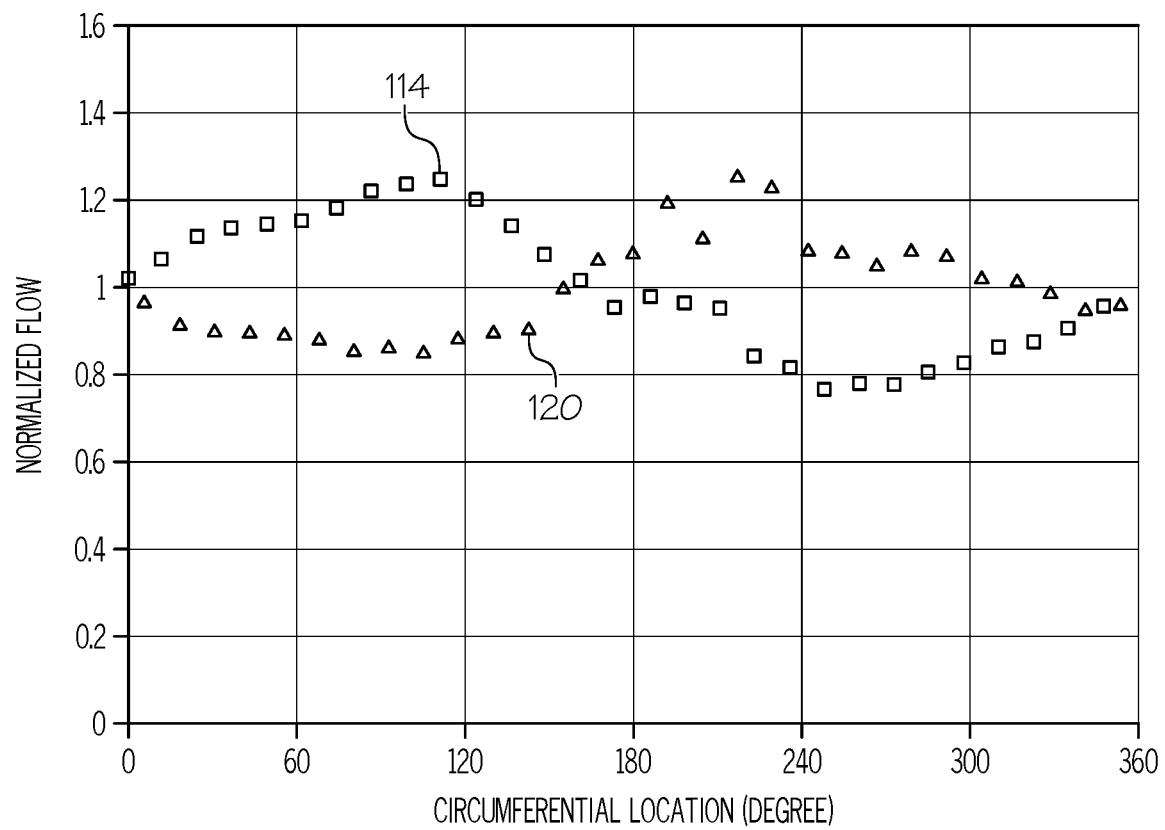
FIG. 4 is a plot of flow versus circumferential location through the bleed port and main flow exit of various compressor configurations.

It has been found that without including a flow control mechanism, flow through the bleed port 64 is not evenly or uniformly distributed around its circumference. As a result, without correction flow through the main exit 66 will also be ununiformly, or mal-distributed. This is demonstrated in FIG. 4 by a plot of normalized flow versus circumferential location around the compressor 38 in degrees. Normalized flow is indicated as a variation from the value 1, where 1 is the mean flow through the given opening around its circumference. In this example, a zero angular location on the circumference is located at point 112 shown in FIG. 5, approximately 180 degrees opposite the bleed scoop 100. Angular locations are represented as increasing from zero at point 112 in the counter-clockwise direction as viewed in FIG. 5. As shown by the curve 114 in FIG. 4, flow through the bleed port is at 1 near zero and near 180 degrees. These locations coincide with the point 112 and with the bleed scoop 100. Between the point 112 and the bleed scoop 100 within the section 116 (shown in FIG. 5 to the right of the bleed scoop 100), curve 114 shows that flow increases above 1, meaning that without correction, more flow than the mean passes through the right (as viewed), half of the bleed port 64. Flow reaches a high point above 1.2 approximately half-way between the point 112 and the bleed scoop 100. In addition, curve 114 illustrates that flow through the left (as viewed), half of the bleed port designated as section 118 shown in FIG. 5, decreases below 1 to a low value less than 0.8 approximately half-way between the bleed scoop 100 and the point 112. In response to the non-uniform distribution of flow through the bleed port 64, FIG. 4 shows curve 120 which illustrates a resulting mal-distribution of flow around the main exit 66. Generally, as more flow exits through the bleed port 64 at a given angular location, less flow exits through the main exit 66. Similarly, as less flow exits through the bleed port 64 at a given angular location, more flow exits through the main exit 66. As noted above, mal-distribution of flow through the main exit 66 results in unwanted combustion results and therefore is undesirable.

Figure 5:
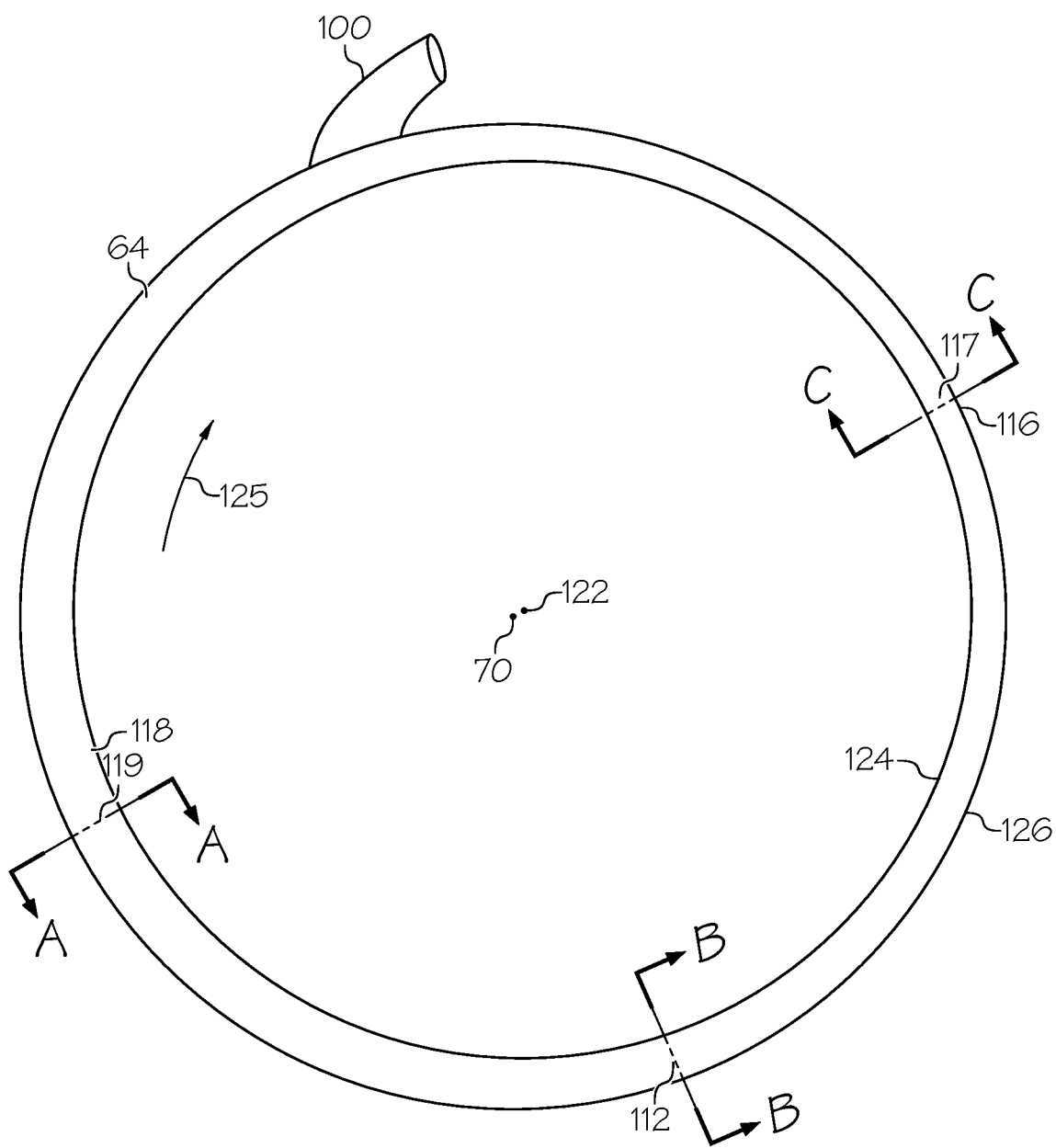
FIG. 5 is a cross sectional illustration of a part of the housing of the compressor of FIG. 2.
Figure 6:
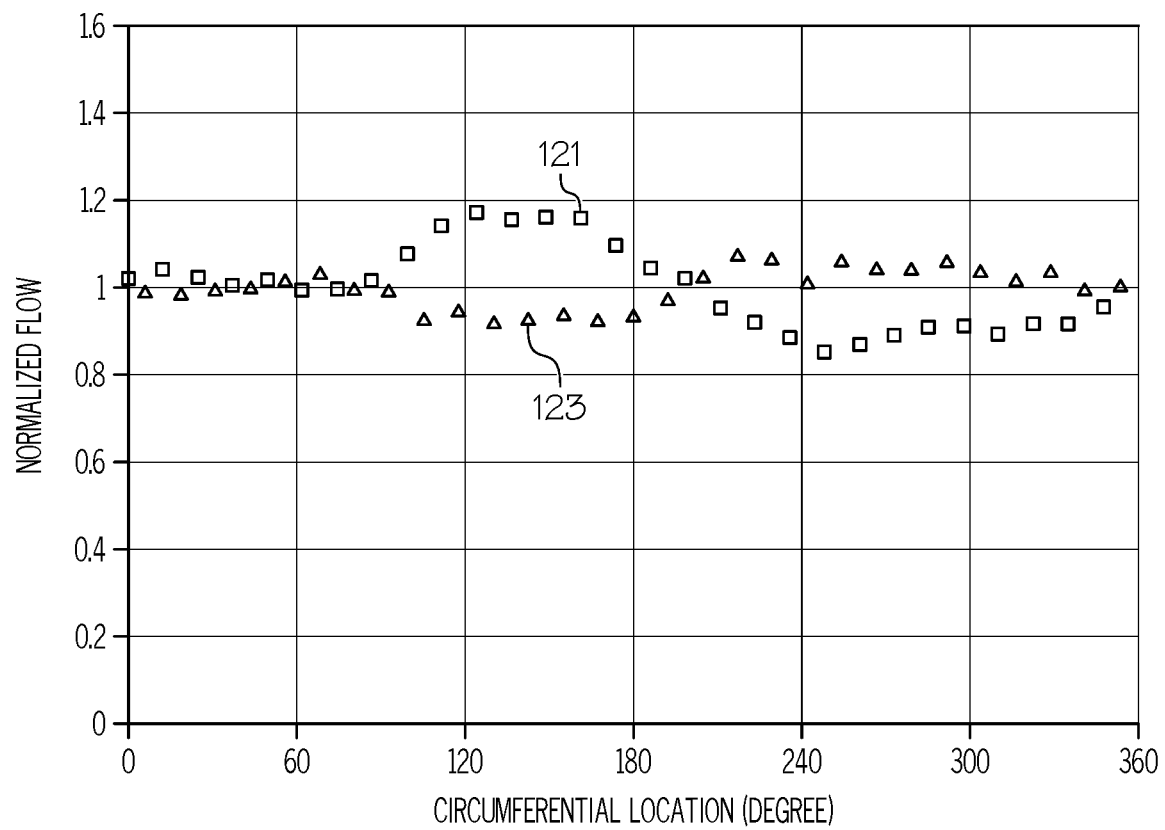
FIG. 6 is a plot of flow versus circumferential location through the bleed port and main flow exit of various compressor configurations.

Referring to FIG. 5, the bleed port 64 is shown schematically. To correct the mal-distribution of flow through the main exit 66, the bleed port 64 is most open at a point 119 that is located upstream from the bleed scoop 100 a distance less than 180 degrees (in this example approximately 90 degrees), and is least open at a point 117 that is located downstream from the bleed scoop 100 a distance less than 180 degrees (in this example approximately 90 degrees). To evenly distribute flow at angular locations through the bleed port 64, the size of the bleed port is varied by offsetting the center 122 of the edge of its inner wall 124 from the axis 70. Rotation 125 of the impeller 58 is clockwise (as viewed in FIG. 5), in this example, resulting in a clockwise flow in the bleed annulus 68 as shown in FIG. 2. The inner wall defines a radially innermost perimeter of the bleed port 64. The outer wall 126 defines the bleed port 64 and is centered on the axis 70. The outer wall 126 defines the radially outermost perimeter of the bleed port 64. In this example, the inner and outer walls 124, 126 are circular in shape, accordingly, the bleed port 64 is reduced in flow size in the section 118 and is increased in flow size in the section 118. The result is that the flow through the bleed port 64 is more evenly distributed around its circumference, with the value of the flow approaching 1 at all angular locations as shown by curve 121 in FIG. 6. In response, the flow through the main exit 66 is more evenly distributed as shown by curve 123. In other examples, the walls 124, 126 may not be circular and instead may take a variety of shapes dictated by considerations such as the need for flow control, the shape of the involved structure, and packaging availability.

Figure 7A:
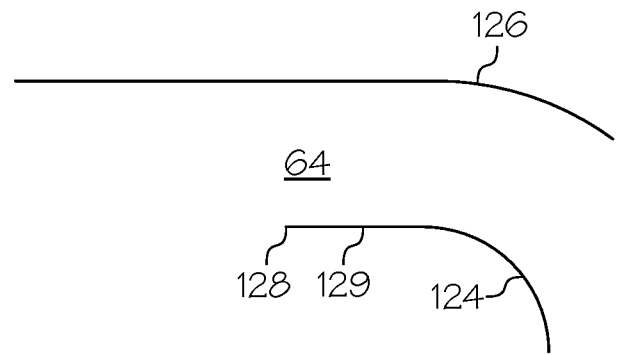
FIGS. 7A-7C are schematic cross sectional illustrations of the bleed port of FIG. 3 at various circumferential locations, according to various embodiments.
Figure 7B:
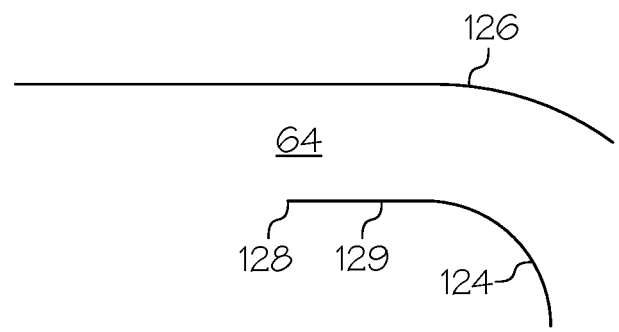
Figure 7C:
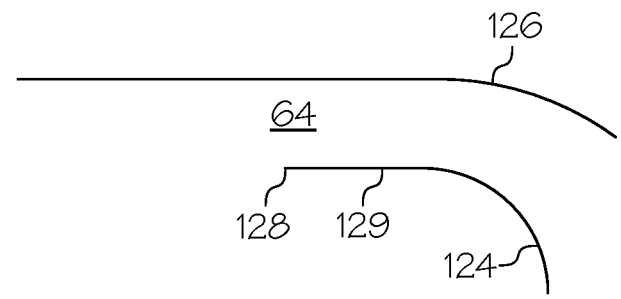

FIGS. 7A-7C illustrate variation of the bleed port 64 by "hub" translation. FIG. 7A shows a section of the bleed port 64 taken as indicated by the line A-A in FIG. 5 and is relatively open in flow size, with spacing between the walls 124, 126 increased. This section is located in the section 118. FIG. 7B shows a section of the bleed port 64 taken through the line B-B in FIG. 5. This section is located between the sections 116, 118 and is nominal in flow size, with spacing between the walls 124, 126 being average. FIG. 7C shows a section of the bleed port 64 taken through the line C-C in FIG. 5. This section is located in the section 116 and is relatively closed in flow size, with spacing between the walls 124, 126 reduced. In this example, flow is turned after and/or while passing through the bleed port 64. The inner wall 124 includes a segment 129 adjacent the edge 128 that is cylindrical is shape and that is disposed parallel to the axis 70 at the locations of each of the FIGS. 7A-7C. The bleed port 64 is translated between relatively open and relatively closed flow size conditions around its perimeter by offsetting the inner wall 124, which may be a hub of the structure, relative to the axis 70. The edge 128 and the segment 129 of the inner wall 124 may therefore have consistent shapes around the perimeter of the inner wall 124.

Figure 8A:
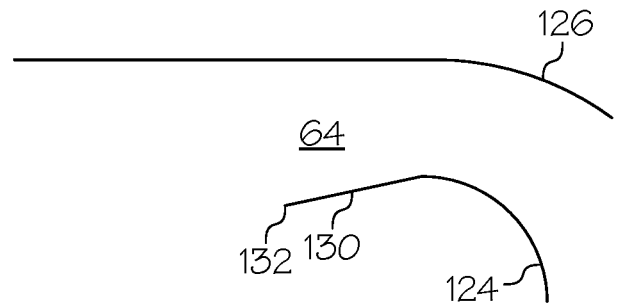
FIGS. 8A-8C are schematic cross sectional illustrations of the bleed port of FIG. 3 at various circumferential locations, according to various embodiments.
Figure 8B:
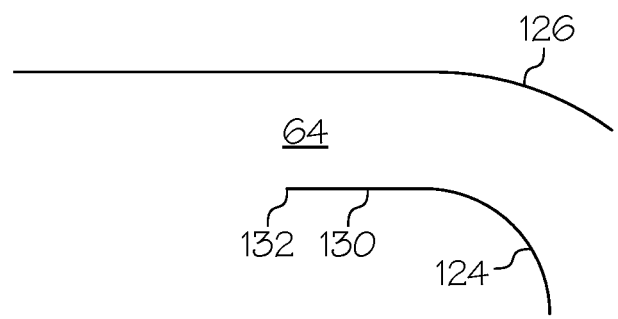
Figure 8C:
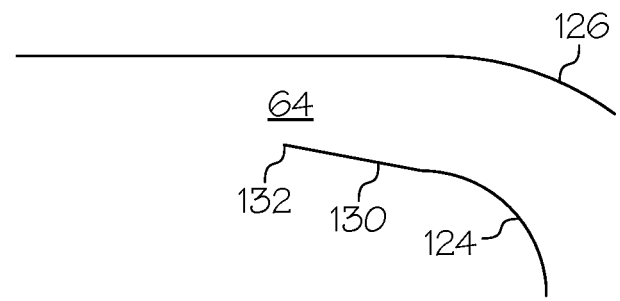

FIGS. 8A-8C illustrate variation of the bleed port 64 by "tip" translation. FIG. 8A shows a section of the bleed port 64 taken as indicated by the line A-A in FIG. 5 and is relatively open in flow size. This section is located in the section 118. FIG. 8B shows a section of the bleed port 64 taken through the line B-B in FIG. 5. This section is located between the sections 116, 118 and is nominal in flow size. FIG. 8C shows a section of the bleed port 64 taken through the line C-C in FIG. 5. This section is located in the section 116 and is relatively closed in flow size. Flow is from the right to the left as viewed in FIGS. 8A-8C. In this example flow is turned after and/or while passing through the bleed port 64. The bleed port 64 is translated between relatively open and relatively closed flow size conditions around its perimeter by forming the segment 130 so that the tip at edge 132 varies in distance from the outer wall 126. The inner wall 124 therefore has a varying shape around its perimeter. In this example, at the location of FIG. 7A, the segment 130 angles toward the axis 70 when moving along the segment 130 toward the edge 132. At the location of FIG. 7B, the segment 130 is disposed parallel to the axis 70, with the axis at the center of the segment 130. At the location of FIG. 7C, the segment 130 angles away from the axis 70 when moving along the segment 130 toward the edge 132. As a result of translating the tip at edge 132, the bleed port 64 has an enlarged flow size at the section 118 and a reduced flow size at the section 116.

Through the examples described herein, an improved manner of separating bleed flow from the main flow leaving a compressor is accomplished by influencing the flow characteristics through the design of the bleed port 64. Variation in the bleed port 64 around its circumference corrects any circumferential mal-distribution of the main flow that may otherwise result from non-uniform flow through the bleed port 64. This is accomplished by increasing or decreasing the flow size of the bleed port 64, and therefore increasing or decreasing the amount of flow, at angular locations to offset non-uniform flow conditions that may otherwise result from the construction of the compressor. This is accomplished without including a scroll-type volute. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A compressor system comprising:
   a compressor with a housing defining a compressor chamber;
   an impeller disposed to rotate in the compressor chamber;
   a diffuser extending around the impeller and configured to collect fluid leaving the impeller;
   an exit through which a main flow of the fluid is discharged from the diffuser, the exit providing an opening that extends circumferentially around the compressor;
   a bleed annulus extending around the compressor and having a consistent cross-sectional area around the compressor; and
   a bleed port that opens the diffuser to the bleed annulus and that is configured to divert a bleed flow of the fluid from the main flow before discharge through the exit, the bleed port having a circumference around the compressor and a flow size that varies around the circumference;
   wherein variation in the flow size of the bleed port is configured to maintain a uniform flow distribution around the exit.

2. The compressor system of claim 1 wherein the impeller rotates about an axis, and wherein the exit is annular in shape encircling the axis, and has a consistent open size around the axis.

3. The compressor system of claim 1 wherein the bleed flow is routed out of the compressor without passing through a volute.

4. The compressor system of claim 1 wherein the impeller rotates about an axis and comprising:
   an outer wall defining a radially outer-most perimeter of the bleed port; and
   an inner wall defining a radially inner-most perimeter of the bleed port wherein the inner wall includes a segment that is cylindrical in shape;
   wherein the outer wall is disposed around the axis as its center and the inner wall is configured with a hub translation that is offset so that the axis is not at the inner wall's center.

5. The compressor system of claim 1 wherein the impeller rotates about an axis and comprising:
   an outer wall defining a radially outer-most perimeter of the bleed port; and
   an inner wall defining a radially inner-most perimeter of the bleed port wherein the inner wall includes a segment that is configured with a tip translation so that at different locations the segment angles toward the axis, angles away from the axis, and is parallel with the axis.

6. The compressor system of claim 1 wherein the impeller rotates about an axis defining an axial direction, the bleed port is configured to channel the bleed flow in the axial direction into the bleed annulus, and comprising a bleed scoop configured to channel the bleed flow out of the bleed annulus in a radial direction away from the axis.

7. The compressor system of claim 1 comprising a bleed scoop located outward from the bleed annulus in a radial direction and configured to receive the bleed flow from the bleed annulus, wherein the bleed port is most open at a first point that is upstream from the bleed scoop less than 180 degrees and is least open at a second point that is downstream from the bleed scoop less than 180 degrees.

8. The compressor system of claim 1 comprising a combustor, wherein the compressor is configured to supply the main flow to the combustor.

9. The compressor system of claim 1 comprising a number of vanes disposed in the diffuser to direct the fluid, wherein the bleed port is located outward from the vanes in a radial direction so that the fluid passes by the vanes before reaching the bleed port.

10. A compressor system comprising:
    a compressor with a housing defining a compressor chamber;
    an impeller having an outer periphery and disposed to rotate in the compressor chamber, the impeller configured to move a fluid away from its outer periphery;
    a diffuser extending around the impeller and configured to collect the fluid leaving the outer periphery of the impeller;
    an exit through which a main flow of the fluid is discharged from the diffuser, the exit providing an opening that extends circumferentially around the compressor;
    a bleed annulus extending around the compressor in an annular shape and having a consistent cross-sectional area for circumferential flow of the fluid around the compressor; and
    a bleed port that opens the diffuser to the bleed annulus and that is configured to divert a bleed flow of the fluid from the main flow before discharge of the main flow through the exit, the bleed port having a circumference around the compressor and a flow size that varies around the circumference;
    wherein variation in the flow size of the bleed port is configured to maintain a uniform flow distribution around the exit.

11. The compressor system of claim 10 wherein the impeller rotates about an axis, and wherein the exit has a consistent open size around the axis.

12. The compressor system of claim 10 wherein the compressor is configured to channel the from the diffuser and out of the compressor without passing through a volute.

13. The compressor system of claim 10 wherein the impeller rotates about an axis and comprising:

an outer wall of the housing defining a radially outer-most perimeter of the bleed port; and an inner wall defining a radially inner-most perimeter of the bleed port wherein the inner wall includes a segment that is cylindrical in shape;

wherein the outer wall is disposed around the axis and is centered on the axis and the inner wall is configured with a hub translation effect so that it is offset and not centered on the axis.

14. The compressor system of claim 10 wherein the impeller rotates about an axis and comprising:

an outer wall of the housing defining a radially outer-most perimeter of the bleed port; and an inner wall defining a radially inner-most perimeter of the bleed port wherein the inner wall includes a segment that is configured with a tip translation effect so that at different locations the segment angles toward the axis, angles away from the axis, and is parallel with the axis.

15. The compressor system of claim 10 wherein the impeller rotates about an axis defining an axial direction, the bleed port is configured to channel the bleed flow in the axial direction into the bleed annulus, and comprising a bleed scoop configured to channel the bleed flow out of the bleed annulus in a radial direction away from the axis.

16. The compressor system of claim 10 comprising a bleed scoop located outward from the bleed annulus in a radial direction and configured to receive the bleed flow from the bleed annulus, wherein the bleed port is most open at a first point that is upstream from the bleed scoop less than 180 degrees and is least open at a second point that is downstream from the bleed scoop less than 180 degrees.

17. The compressor system of claim 10 comprising a combustor, wherein the compressor is configured to supply the main flow to the combustor.

18. The compressor system of claim 10 comprising a number of vanes disposed in the diffuser to direct the fluid, wherein the bleed port is located outward from the vanes in a radial direction so that the fluid passes by the vanes before reaching the bleed port.

19. A compressor system with a compressor for supplying combustion air to the combustor of an auxiliary power unit of an aircraft comprising:

a housing defining a compressor chamber;

an impeller disposed to rotate in the compressor chamber, the impeller having a discharge area defined by its outer periphery;

a diffuser extending around the outer periphery to collect gas leaving the discharge area of the impeller;

an annular exit through which the gas is discharged from the diffuser to the combustor;

a bleed annulus extending around the compressor and having a consistent cross-sectional area around the compressor;

a bleed port that opens the diffuser to the bleed annulus to divert gas from the diffuser before discharge through the annular exit, the bleed port having a circumference around the compressor and a flow size that varies around the circumference; and a bleed scoop receiving gas from the bleed annulus that is diverted from the diffuser through the bleed port;

wherein variation in the flow size of the bleed port maintains a consistent, uniform flow distribution around the annular exit to the combustor.

20. The compressor system of claim 19 wherein the combustor is a gas turbine combustor.

* * * * *